United States Patent
Wang et al.

(10) Patent No.: US 8,116,511 B2
(45) Date of Patent: Feb. 14, 2012

(54) EARPHONE

(75) Inventors: Wen-Wu Wang, Shenzhen (CN); Shih-Fang Wong, Taipei Hsien (TW); Tsung-Jen Chuang, Taipei Hsien (TW)

(73) Assignees: Hong Fu Jin Precision Industry (ShenZhen) Co., Ltd., Shenzhen, Guangdong, Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 1235 days.

(21) Appl. No.: 11/829,094

(22) Filed: Jul. 27, 2007

(65) Prior Publication Data

US 2008/0025543 A1 Jan. 31, 2008

(30) Foreign Application Priority Data

Jul. 28, 2006 (CN) .......................... 2006 1 0061861

(51) Int. Cl.
*H04R 25/00* (2006.01)
(52) U.S. Cl. .......................... 381/411; 381/123; 381/370
(58) Field of Classification Search .................. 381/123, 381/370, 411, 303, 309
See application file for complete search history.

(56) References Cited

U.S. PATENT DOCUMENTS

| 2,176,732 A * | 10/1939 | Faber ............................... 381/85 |
| 4,132,861 A | 1/1979 | Frieder, Jr. et al. |
| 4,219,789 A * | 8/1980 | Frangos .......................... 333/32 |
| 4,634,958 A * | 1/1987 | Cornwell ....................... 323/255 |
| 4,944,015 A | 7/1990 | Juve et al. |
| 6,222,167 B1 * | 4/2001 | Wada et al. .................... 219/645 |
| 2002/0118843 A1 * | 8/2002 | Totani et al. ..................... 381/77 |
| 2004/0047479 A1 * | 3/2004 | Porzilli et al. ................. 381/182 |
| 2007/0183620 A1 * | 8/2007 | Stiles et al. .................... 381/401 |
| 2007/0189554 A1 * | 8/2007 | Innis et al. ..................... 381/111 |

FOREIGN PATENT DOCUMENTS

CN 2575927 Y 9/2003

* cited by examiner

*Primary Examiner* — David S. Warren
(74) *Attorney, Agent, or Firm* — Altis Law Group, Inc.

(57) ABSTRACT

An earphone with adjustable impedance is provided. The earphone mainly includes an earphone body, a communication line, an earphone plug, an alter switch and an adjustable impedance unit used for adjusting an impedance of the earphone. The adjustable impedance unit is connected between the earphone plug and the earphone body through the alter switch. The impedance of the earphone can be matched on the output impedance of the media player by adjusting the impedance of the adjustable impedance unit when an earphone is connected with a media player.

1 Claim, 4 Drawing Sheets

// EARPHONE

BACKGROUND OF THE INVENTION

1. Field of the Invention

The present invention relates to earphones, especially to an earphone with adjustable impedance.

2. General Background

Generally, when using a media players in a public place, the user can use an earphone to avoid disturbing other people around. However, different multimedia players have different output impedances, for example, the output impedance of the earphone jack of the video compact disc (VCD) player, digital video disc (DVD) player and TVs are about 200 ohm or higher, the output impedance of the earphone jack of the MP3 player and MiniDisc (MD) player is about 50 ohm or lower. If an earphone with low impedance is insert into the earphone jack of the VCD player, DVD player and TVs and the like, the earphone with low impedance will be over loading and resulted in damage, and if an earphone with high impedance is insert into the earphone jack of the MP3 player and the MD player, the earphone with high impedance is difficult to drive to output an audible sound. So earphones with high or mid-range impedance are compatible with the VCD player, DVD player, and the TVs; earphones with low impedance are suitable for portable electronic media players, such MP3 player and MD player. As a result, when a user possesses different types of media players, the user must buy earphones with different impedance to match the media players, which will raise cost to the user.

Therefore, it is necessary to provide an earphone can match a plurality of media players.

SUMMARY OF INVENTION

An earphone includes an earphone plug, an earphone body, a communication line. The earphone further includes an adjustable impedance unit and an alter switch. The earphone plug connects with a jack of a media player for obtaining a sound signal outputted by the media player. The earphone body connects with the adjustable impedance unit for converting the sound signal to audible sound. The adjustable impedance unit includes a plurality of voice lines with different impedance. The alter switch includes a movable contact connectable with the adjustable impedance unit, the movable contact is further used for connecting one of the plurality of voice lines, thereby changing the impedance of the earphone. When the earphone is inserted into a media player, the user can adjust the alter switch in order to obtain a matched impedance of the earphone accordance with the output impedance of the media player.

DETAILED DESCRIPTION OF THE EMBODIMENTS

Figure 1:
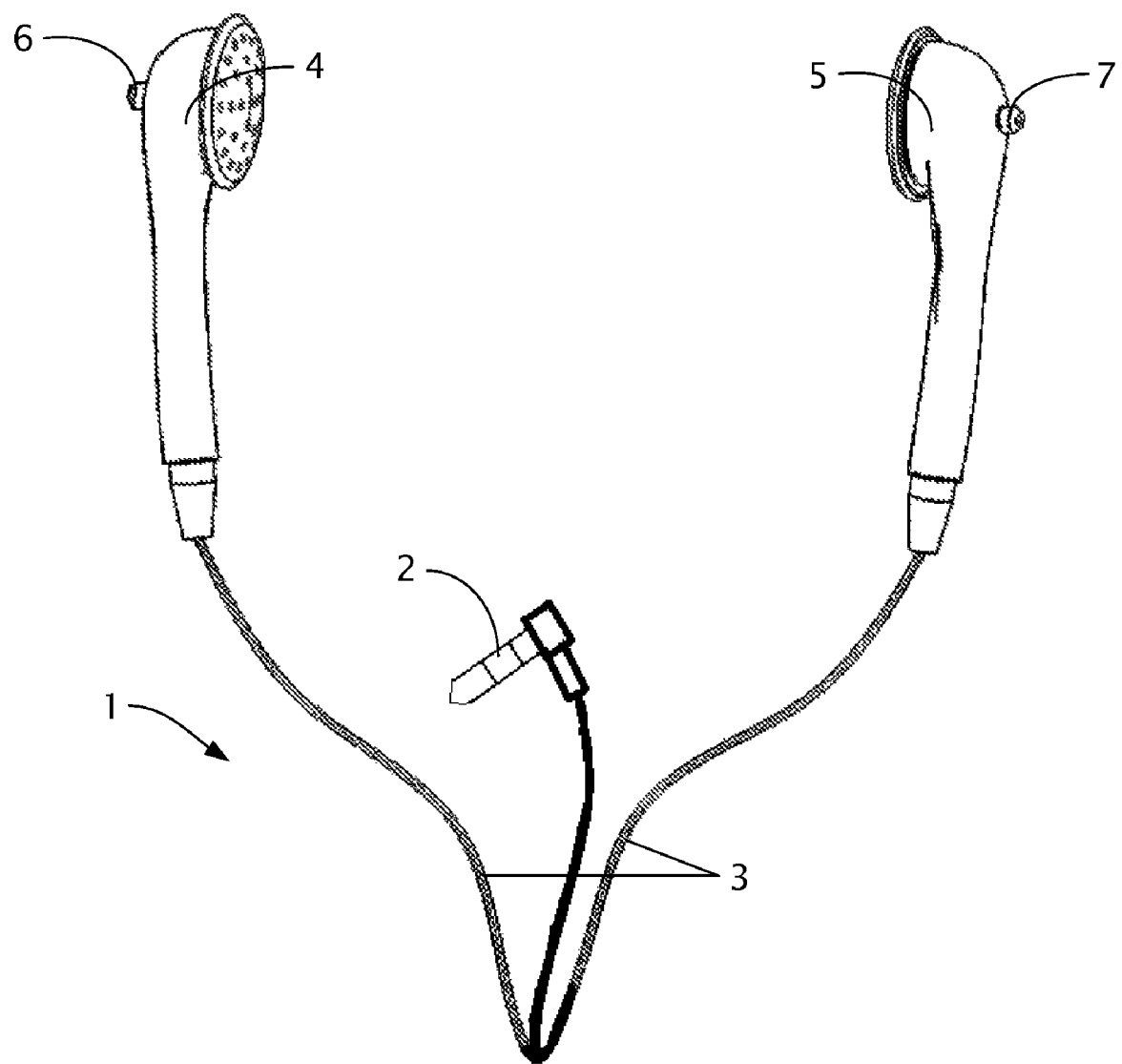
FIG. 1 is a perspective view of an earphone showing the position of an alter switch mounted on the earphone body.

FIG. 1 is a perspective view of an earphone showing the position of an alter switch mounted on the earphone body. The earphone 1 includes an earphone plug 2, a communication line 3, two earphone bodies 4 and 5, two alter switches 6 and 7 are mounted on the earphone bodies 4 and 5 respectively. The earphone plug 2 connects with the earphone bodies 4 and 5 via the communication line 3, the earphone plug 2 is used for receiving audio signals from a media player (not shown), the earphone bodies 4 and 5 are used for converting the audio signals to an audible sound. The earphone bodies 4 and 5 have the same properties, hereinafter, the earphone body 4 is employed to illustrate the present invention.

Figure 2:
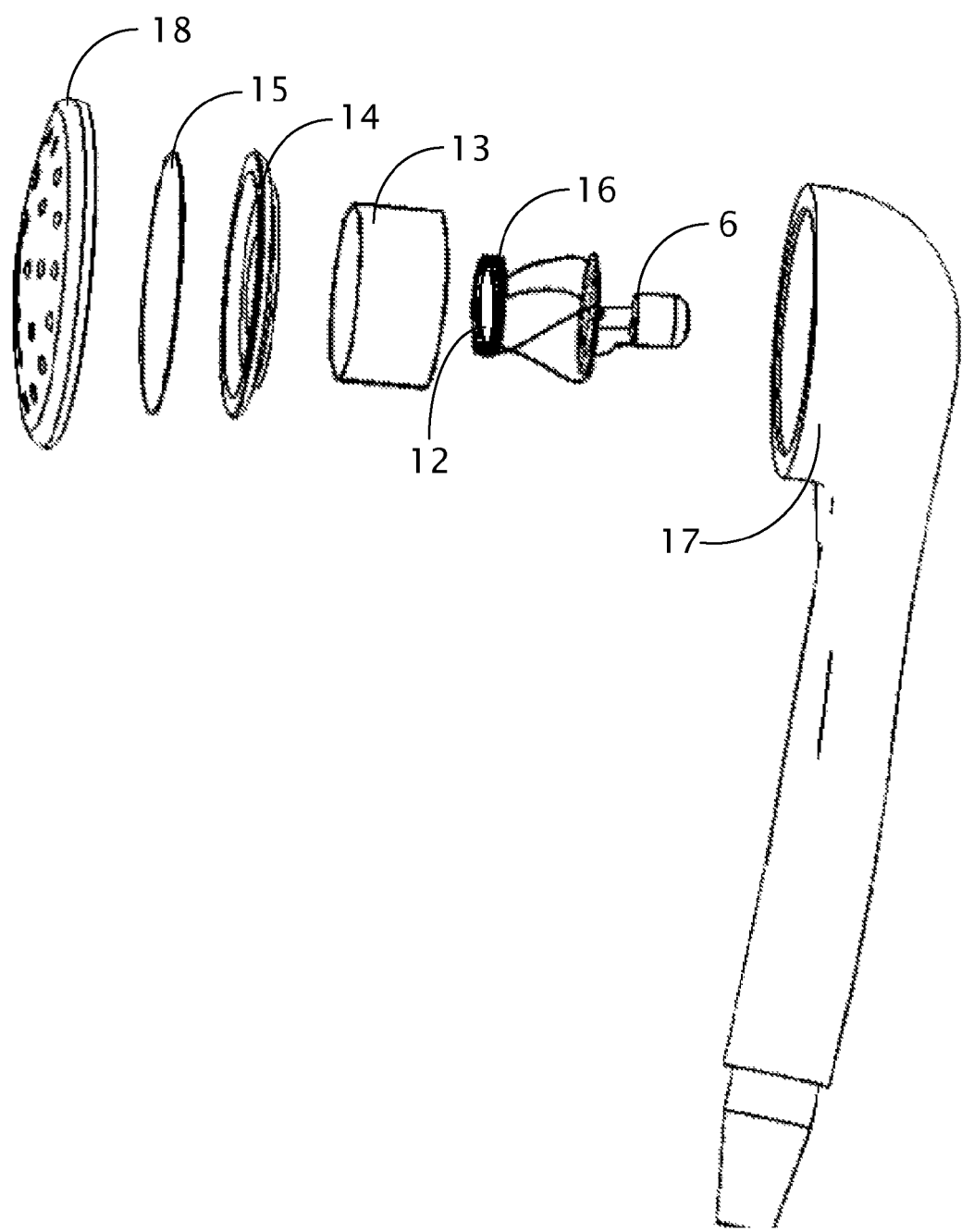
FIG. 2 shows an explosive view of an earphone body of the earphone of FIG. 1.

Shown as FIG. 2, the earphone body 4 includes an insulated rod 12, a magnetic rod 13, a ferromagnetic plate 14, a diaphragm 15, an adjustable impedance unit 16, a housing 17 and a cover 18. The alter switch 6 is also mounted in the housing 17. The diaphragm 15 is supported by the ferromagnetic plate 14, the magnetic rod 13 is configured between the ferromagnetic plate 14 and the adjustable impedance 16, the insulated rod 12 is surrounded by the adjustable impedance unit 16. The alter switch 6 connects the adjustable impedance unit 16. Configured in this way, the earphone body 4 can convert the audio signal to audible sound, and change it's impedance to match the output impedance of the media player.

Figure 3:
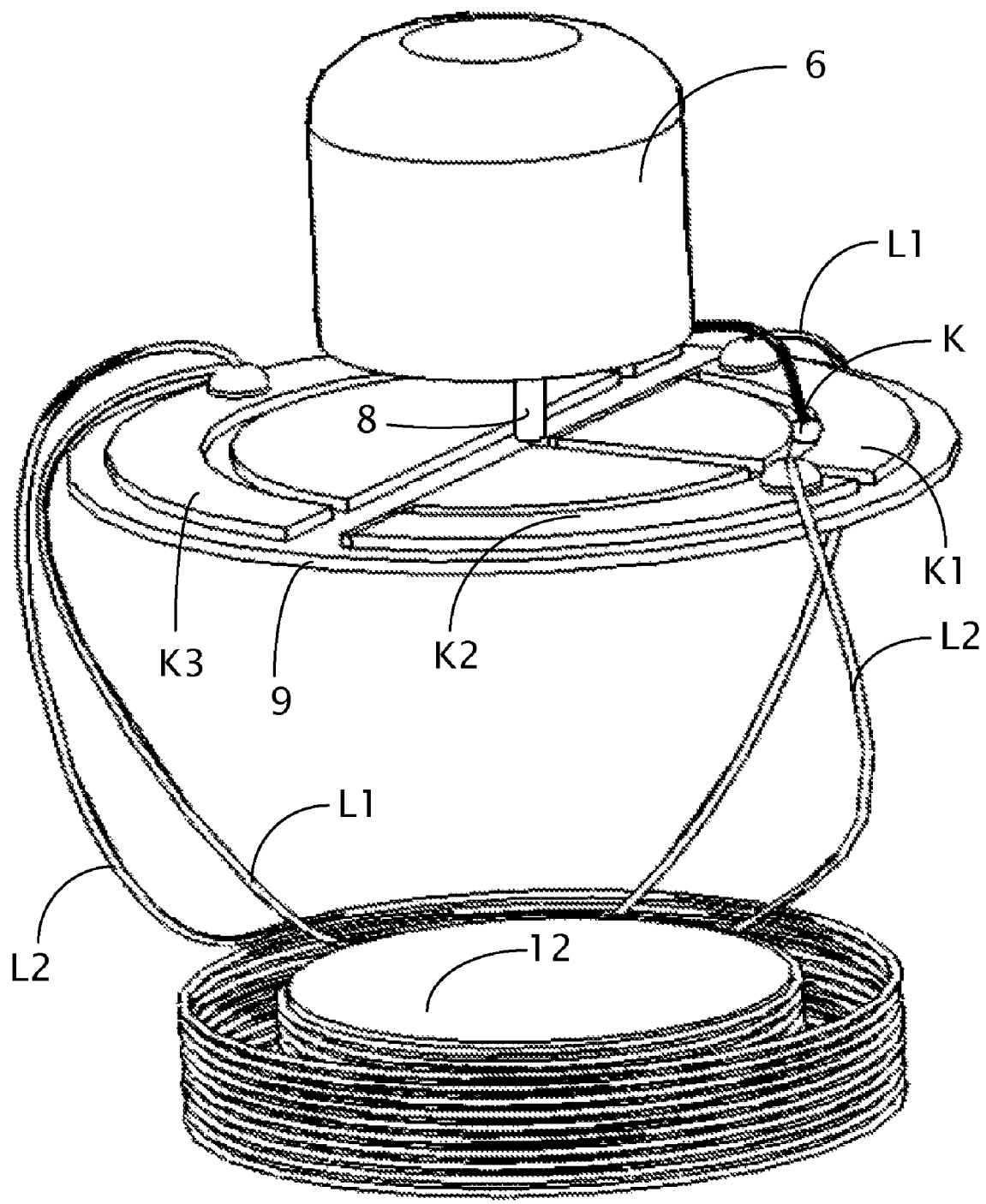
FIG. 3 shows a side perspective view of a alter switch and a adjustable impedance unit of the earphone of FIG. 1.

FIG. 3 shows details of the alter switch connectable with the adjustable impedance unit. The alter switch 6 includes a movable contact K, an fixed axis 8, an insulated plate 9 and a plurality of static contacts, in the preferred embodiment, the static contacts K1, K2 K3 are illustrated. The movable contact K can be rotated around the fixed axis 8. The adjustable impedance unit 16 may include one or more resistors, one or more capacitors and/or one or more voice coils. For simplicity, a plurality of voice coils L1, L2 are employed to constitute the adjustable impedance unit 16 to illustrate the preferred embodiment. In the preferred embodiment, the impedance values of the voice coils L1, L2 are respectively 16 ohm, 200 ohm. Shown in FIG. 3, one terminal of the voice lines L1 connects to the static contact K1, the other terminal of the voice L1 connects to static contact K3; one terminal of the voice lines L2 connects to the static contact K2, the other terminal of the voice L2 connects to static contact K3. The adjustable impedance unit 16 can changes it's impedance value by operating the alter switch 6 and accordingly changes an impedance value of the earphone, thus to match the output impedance of the media player.

Figure 4:
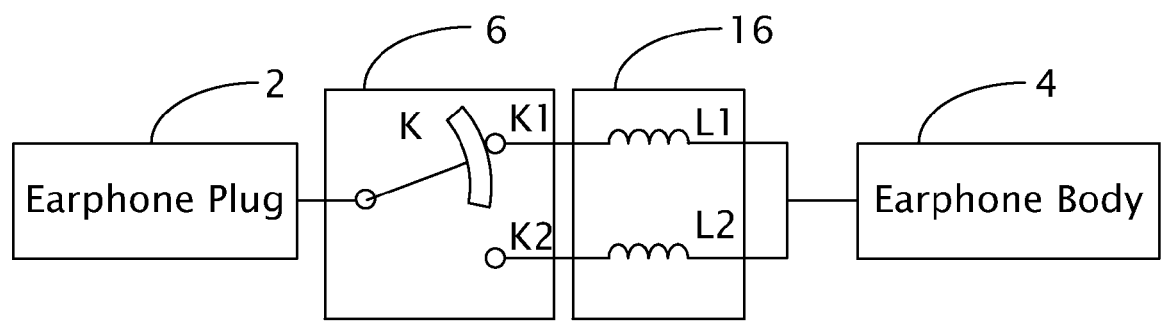
FIG. 4 is a schematic diagram of an earphone in accordance with a preferred embodiment of the present invention.

FIG. 4 shows details of the adjustable impedance unit 16. The static contacts K1, K2 are illustrated and respectively connected with the voice coils L1, L2. The movable contact K is operable to move between the static contacts K1, K2, and connects the earphone plug 2 to the earphone body 4 via the voice coils L1, L2 respectively. Specifically, if the movable contact K is operated to connect with the static contact K1, the voice coil L1 is connected between the earphone plug 2 and the earphone body 4, and the impedance value of the earphone is about 16 ohm. If the movable contact K is operated to connect with the static contact K2, the voice coil L2 is connected between the earphone plug 2 and the earphone body 4, and the impedance value of the earphone is about 200 ohm. With such a configuration, the impedance of the earphone is choose to match with the output impedance of the media player.

The advantage of the present invention is that the impedance of the earphone is choose to match with the output impedance of the media player through adjusting the impedance of the adjustable impedance unit of the earphone.

Although the present invention has been specifically described on the basis of a preferred embodiment and method thereof, the invention is not to be construed as being limited thereto. Various changes or modifications may be made to the embodiments without departing from the scope and spirit of the invention.

What is claimed is:

1. An earphone comprising:
    an earphone plug connectable with a media player to obtain sound signals from the media player;
    an alter switch comprising a moving contact and a plurality of static contacts; and
    an earphone body for converting the sound signals to audible sound, comprising:
    an insulated rod;
    an adjustable impedance unit connected to the earphone plug and surrounding the insulated rod, configured for changing the impedance of the earphone to match the output impedance of the media player; and
    an earphone housing having an interior and an exterior;
    wherein said moving contact point, said plurality of static contacts, said adjustable impedance unit, and said insulated rod are contained within the housing, and wherein said alter switch extends through said housing to said housing exterior.

* * * * *